Sept. 16, 1952  J. B. COOPER ET AL  2,610,564
RATIO CONTROL FOR PRESSURE CABINS
Filed May 16, 1942  8 Sheets-Sheet 1

Inventors
James B. Cooper
Alfred B. Jepson
By Reynolds Beach
Attorneys

Inventors
James B. Cooper
Alfred B. Jepson
By Reynolds + Beach
Attorneys

Inventors
James B. Cooper
Alfred B. Jepson
Reynolds + Beach
Attorneys

Sept. 16, 1952  J. B. COOPER ET AL  2,610,564
RATIO CONTROL FOR PRESSURE CABINS
Filed May 16, 1942  8 Sheets-Sheet 6

Inventors
James B. Cooper
Alfred B. Jepson
By Reynolds & Beach
Attorneys

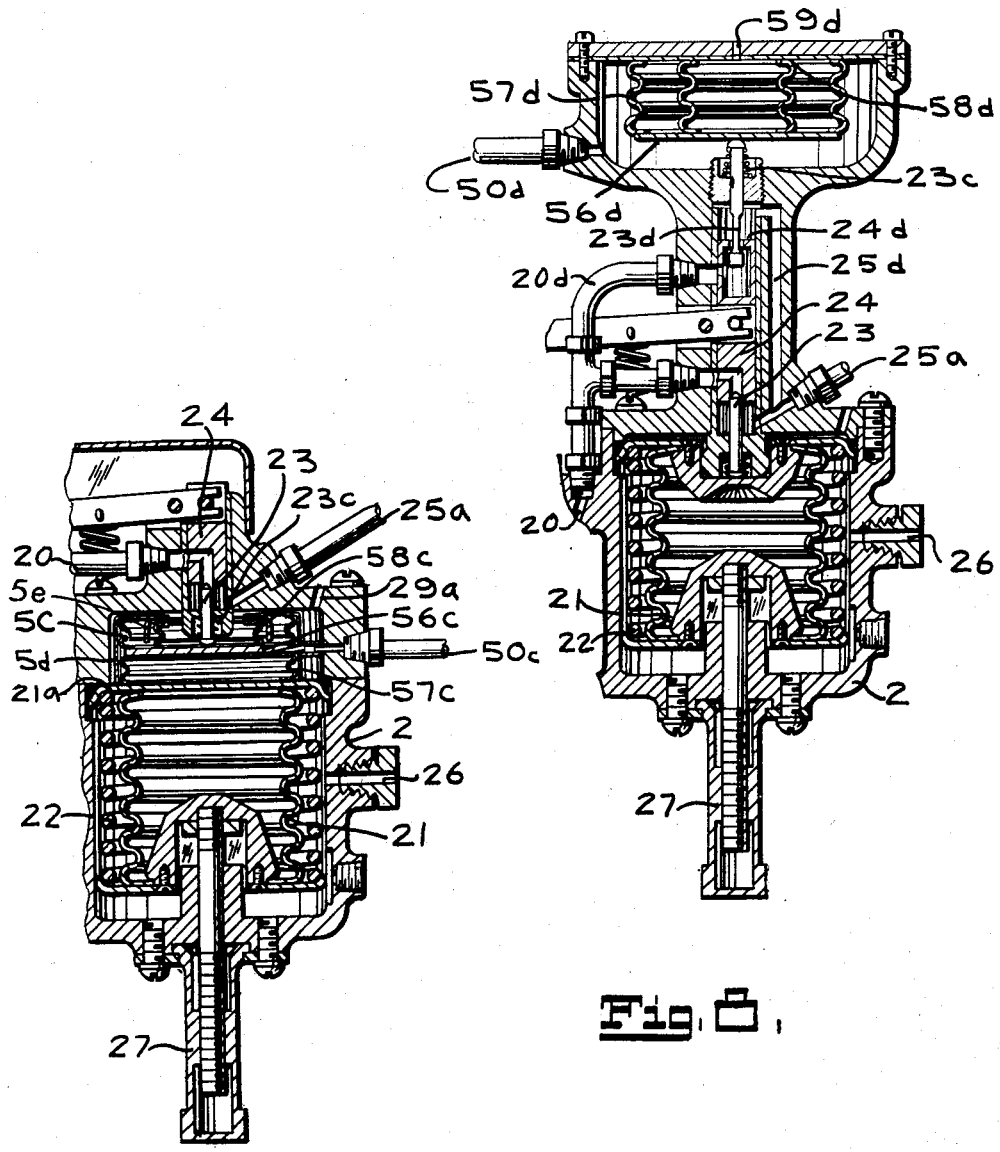

Patented Sept. 16, 1952

2,610,564

UNITED STATES PATENT OFFICE 2,610,564

RATIO CONTROL FOR PRESSURE CABINS

James B. Cooper and Alfred B. Jepson, Seattle, Wash., assignors to Boeing Airplane Company, a corporation of Delaware Application May 16, 1942, Serial No. 443,181

27 Claims. (Cl. 98—1.5)

The maintenance of pressure within an aircraft cabin (or like habitable space which is intended to be included in the term "cabin") involves two factors physiologically necessary to support life and a given degree of activity: first, maintenance of sufficient pressure, and second, provision for adequate ventilation. It is with these two factors that the present invention, in common with all present-day pressure-cabin systems, is concerned. There may be also a third factor required to improve conditions, namely, the supply of an adequate volume of oxygen, but since oxygen supply alone will not suffice unless the pressure be adequate, and since with adequate pressure and adequate ventilation there is generally sufficient oxygen supplied to support human life, if not to support a high degree of activity, and at the same time sufficient elimination of carbon dioxide, the third factor in a sense becomes subordinate to the first two mentioned. It need not be considered here, the more so as known auxiliary means may be provided for the supply of oxygen, if required.

Structurally other considerations apply. It is scarcely feasible to construct an airplane cabin sufficiently strong to maintain sea level pressure at all altitudes. Accordingly it is customary to select some pressure difference between cabin pressure and exterior pressure which will be the limit the design is intended to support. At low exterior pressures this will result in a low cabin absolute pressure, but inevitably, as exterior pressure decreases, the ratio of cabin pressure to exterior pressure rises. If the differential pressure selected is four pounds per square inch, and we assume an exterior pressure of two pounds per square inch, the ratio is 6 to 2, or 3 to 1 whereas if the exterior pressure is assumed to be one pound per square inch and the differential pressure again 4 pounds per square inch, the ratio is 5 to 1. The cabin absolute pressure, however, has changed from six pounds per square inch, in the first instance, to five pounds per square inch in the second, a decrease of only 17%, while the ratio has been almost doubled, by a one pound decrease of exterior pressure.

The superchargers or blowers used for supplying pressure cabins each have a definite maximum compression ratio; for example, a given blower may have a 3 to 1 compression ratio, meaning that its maximum output pressure can not exceed three times the pressure of the intaken air. If the atmospheric pressure is low, as it is at high altitudes, the cabin absolute pressure with such a blower can not exceed three times the atmospheric pressure. At some selected high altitude this cabin absolute pressure, at maximum compression ratio, becomes the minimum absolute pressure permissible to support the requisite degree of human activity, although a higher pressure would be desirable. If this altitude is the service ceiling of the airplane, there is thus determined a design factor to which other design factors can refer. In other words, by selecting a blower which has a compression ratio such that at the service ceiling of the airplane it can supply the minimum adequate cabin absolute pressure, that is sufficient, for over a wide range of lower altitudes it will be able to produce a much higher differential, one as great as the cabin structure can withstand. It is not necessary to select a blower which can maintain at the ceiling the maximum differential pressure which is safe for the structure, as well as throughout an intermediate high altitude range, for the weight of such a blower would be excessive. As a result the performance of the airplane would be reduced while such extra capacity would be desirable only rarely, at the highest attainable altitudes. The benefit to be expected from a blower of such high capacity would not offset the disadvantage of the added weight. Therefore a blower is selected which has adequate capacity to maintain the maximum allowable cabin differential pressure in an intermediate altitude range, and will deliver at ceiling, and at its rated compression ratio, at least the minimum permissible cabin absolute pressure, requiring a lesser differential.

But this blower compression ratio (3 to 1, in the assumed instance), which at the ceiling is equivalent to a differential pressure, in this instance, of twice atmospheric pressure, or a cabin to external pressure of 3 to 1, will usually produce at ceiling a very low absolute cabin pressure, and a lower differential pressure than would ordinarily be desirable. In other words, at somewhat lower altitudes the blower would have entirely adequate capacity to produce a materially greater differential pressure, even the maximum which the aircraft structure could withstand, without exceeding or even approaching its maximum compression ratio. It is normally desirable to maintain as high a cabin absolute pressure as is possible (of course, avoiding a pressure higher than sea level), which means as high a differential pressure as is possible within the structural limitations of the airplane. It is therefore necessary, in order to effect such results, to increase the differential pressure somewhat in the highest altitude range, by increments with increasing barometric pressure, and in that way to increase the cabin absolute pressure by increments, as altitude decreases from the ceiling.

The Price Patent No. 2,208,554 attempted to coordinate the human and the structural requirements mentioned above in a practicable control for pressure within aircraft cabins. This control was so designed that the blower, direct-driven from an engine, might be and usually was operated at all times (except at the highest altitudes) substantially at its maximum compression ratio, or at least, materially above the compression ratio necessary to maintain the cabin absolute pressure at the required value, and substantially above the permissible differential pressure. It was therefore necessary to waste the unused part of the work done by the blower at all except the highest altitudes, by holding back excess pressure at the cabin inlet. This represented waste of power. Also, because it was necessary to make sure that there was adequate pressure at the service ceiling, which could not be precisely foretold in the preliminary stages of the design, the blower selected was such as would have a safe excess of capacity at its maximum compression ratio, and this added to the weight, and to the waste of power at all lower altitudes, and detracted from the performance of the airplane as a whole. Also, in order to attain high compression ratios at high altitudes, for maintenance of high differential pressures, and for maintenance of such cabin absolute pressures as would avoid the necessity of using oxygen, multistage blowers were employed, which added to the complications and weight.

In order to meet these structural or design objections it has been proposed by the two present applicants to control the blower speed variably in accordance with pressure requirements, disclosed in Patent No. 2,539,430.

In either such system the blower would ordinarily be designed to afford a desired differential of cabin pressure over exterior pressure up to and usually beyond the designed service ceiling of the airplane, for it was felt that it would be undesirable to permit the cabin differential pressure to drop below a desired value at the service ceiling, or, what is the important thing, to permit the cabin absolute pressure to drop below the selected value at the service ceiling. There is a value for cabin pressure below which oxygen must be supplied, and heretofore this has been taken as the minimum cabin pressure, and the pressurizing system has been designed to prevent a lower cabin pressure, thereby to avoid the necessity of oxygen equipment. This has meant a large and complicated cabin supercharger to insure a sufficient absolute pressure at the ceiling of the airplane to render the use of supplemental oxygen unnecessary, which has proven to involve greater complications than the oxygen equipment, and the ceiling has been limited more by such considerations than by limitations of the airplane. Yet such equipment was of importance only at elevations near the service ceiling of the airplane.

It now appears preferable to reduce the size, weight, and capacity of the cabin supercharging system, and to design it, not with reference to the maintenance within the compression ratio of the blower of a cabin absolute or cabin differential pressure below which the pressure must not drop, but rather to design the system in such manner that at its rated blower capacity the desired or necessary minimum cabin absolute pressure will be attained at the designed service ceiling. In other words, instead of making the differential pressure the limit beyond which at any altitude the cabin pressure may not go, the blower ratio now sets the limit beyond which the cabin pressure may not go.

The present invention, then, provides a pressure cabin system in which the blower's compression ratio is so chosen that the limiting minimum cabin absolute pressure is reached at, but not above, the selected service ceiling of the airplane, and hence affords a precise design factor to which other factors can refer; in which the blower is never permitted to operate at a speed in excess of that which is sufficient to attain the desired cabin pressure at all altitudes; in which, if desired, there may be maintained, at reasonably low altitudes, a constant absolute cabin pressure; in which, under proper circumstances, there may be also a limiting differential pressure established which the cabin pressure may not exceed; and in which, whether the operative control immediately preceding it be an absolute pressure sensitive means or a differential pressure sensitive means which has previously overridden the absolute pressure sensitive means, there is an ultimate overriding device sensitive to or acting in accordance with the ratio of cabin pressure to exterior pressure, or, in effect, acting in accordance with and limited by the blower's compression ratio.

There have been, too, refinements in the equipment used in such pressure cabins. For instance, it is possible to vary the rate of change of pressure within the cabin, not along the curve established by successively operable absolute pressure controls and differential pressure controls, but along a gradually decreasing pressure curve, which yet is higher than or bears some selected relation to the barometric curve, and means to this end are disclosed in the Price application, Serial No. 216,028, filed June 27, 1938. A pressure control or outflow valve has been designed which operates under the influence of a servo control which is subjected to the pressure drop between the cabin and the exterior, as disclosed in Patent No. 2,450,881.

It is intended that such improvements and developments may also be incorporated within the present system, but improvements and refinements of this nature form no necessary part of the present invention. However, the present invention is best described by reference to the control unit of Patent No. 2,450,881, and by reference to a system such as is disclosed in Patent No. 2,539,430.

The present invention is concerned generically with a pressure cabin system wherein is coordinated the necessary pressure at extreme altitudes for proper support of human life, the maximum differential pressure allowable without exceeding the pressure for which the airplane cabin structure is designed, and finally the blower compression ratio so that this is never exceeded. Furthermore our control will reduce the cabin supercharging demands to the necessary pressure so that an adequate continuous flow of air through the cabin for replacement purposes can be maintained even at the highest attainable altitudes by the blower while operating at its rated capacity, so that the blower will not be, on the one hand, too small or of inadequate capacity to force air into the cabin by the demand of the control mechanism for too high a constant differential pressure between the cabin and the atmosphere, nor, on the other hand, too large, heavy, and of excess capacity. Moreover regulation of the pressure in accordance with the blower output pressure will enable the blower to deliver sufficient air at high altitudes to prevent surging conditions in the blower outlet without incorporation of a surge relief device in the air supply mechanism, or a blower speed control operable at such high altitudes. Ultimately, therefore, the airplane will be so designed as to enable it to go to the desired service ceiling, carrying no appreciable excess weight by reason of excess capacity of the cabin supercharging system, and consequently will have improved performance and efficiency at its extreme upper levels, and, of course, at lower levels. A companion application which resulted in Patent No. 2,419,707 is specifically directed to certain species of the mechanism which appear most suited for use with existing systems and control units, particularly those shown in Patents Nos. 2,450,881 and 2,539,430.

The invention is shown in the accompanying drawings in diagrammatic fashion, and it will be understood that various changes may be made in the form, nature, arrangement and relationship of the various parts of this invention, both per se and in relation to the control unit and system of our previous invention, without departing from the spirit and intended scope of the present invention.

Figure 6 is a purely diagrammatic view of a complete system incorporating such a ratio control of the type and as arranged in Figure 9, various components being in section. The system shown, however, is only one of many with which such a ratio control may be incorporated or associated.

Figure 7 is a fragmentary sectional view similar to Figure 1 or 2, illustrating such a control applied to the absolute pressure control of the known unit.

Figure 10:
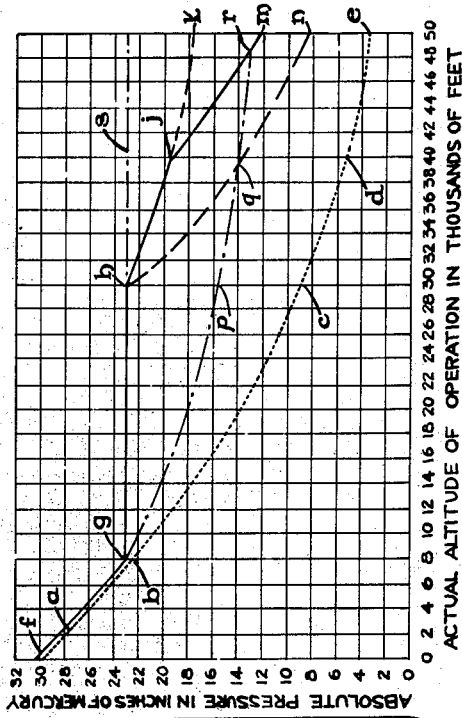
Figure 10 is a graph illustrating typical pressure-altitude relationships which can be obtained by the use of the device of the present invention.

By reference to Figure 10 the purposes of the present invention and the manner in which it attains its ends will be seen at a glance. The barometric curve is shown at $a$—$b$—$c$—$d$—$e$, the absolute values varying from approximately 30 inches of mercury at zero altitude to something less than 4 inches of mercury at 50,000 feet. The latter pressure is far too low to support human life, consciousness and activity. It would be preferable instead that the cabin pressure at 50,000 feet be the equivalent of cabin pressure at not over 16,000 feet, at which the pressure is slightly more than 16 inches of mercury but even this involves a pressure difference of about 12½ inches of mercury above ambient atmospheric pressure at such altitude. The aircraft structure can be made sufficiently strong to withstand this pressure difference, but to maintain this pressure difference at 50,000 feet, where the absolute pressure of the atmosphere only slightly exceeds 3 inches of mercury, would require a blower having a compression ratio of approximately 5 to 1, whereas at 40,000 feet, at which the ambient pressure is about 5⅓ inches of mercury, an absolute cabin pressure of 16 inches of mercury, equal to ambient pressure at 16,000 feet, could be maintained with a blower having a ratio of only 3 to 1. Particularly is a blower ratio of 5 to 1 excessive when a blower of this compression ratio at sea level would be capable of delivering air under pressure in the neighborhood of 150 inches of mercury. It is preferable to provide a blower with fewer stages and consequent lower weight having a compression ratio not higher than about 3.5 to 1, which, as shown by curve $j$—$m$ in Fig. 10 at 43,000 feet would maintain a cabin absolute pressure of 16 inches of mercury, equal to the ambient pressure at 16,000 feet, or perhaps to employ a blower with a still lower compression ratio of about 2.5 to 1, which would maintain such an absolute cabin pressure at almost 37,000 feet, as shown by curve $h$—$n$. Trained and especially conditioned personnel can, with the use of oxygen, endure for limited periods atmospheric pressures equivalent to 35,000 or a maximum of 40,000 feet, though higher pressures are desirable. At 50,000 feet a blower ratio as low as 2.5 to 1 will produce an absolute cabin pressure of about 4 pounds per square inch, or 8 inches of mercury, the equivalent of 32,000 feet.

Assuming the blower with the larger compression ratio, 3.5 to 1, is employed, that compression ratio carried down to lower altitudes will cross the differential pressure line $h$—$k$, representing a differential pressure of 14 inches of mercury, at the point $j$, corresponding to 40,000 feet altitude. Even though the cabin structure, then, might support pressure along the line $h$—$k$ to $k$, the blower's compression ratio places a limit upon the differential that can be maintained, and will produce this differential only to $j$; that is, from 30,000 to 40,000 feet, and then from 40,000 to 50,000 feet the cabin pressure follows the blower compression ratio line $j$—$m$.

If the blower of lower compression ratio 2½ to 1, is used, developing the cabin pressure represented at $n$ at 50,000 feet, its compression ratio, represented by curve $n$—$h$, at altitudes above 30,000 feet, may never be able to exceed the cabin pressure differential of 14 inches of mercury which is permissible, and be able to attain that differential only at or below 30,000 feet. Accordingly, while the cabin structure may be designed to hold the difference attained at that altitude, no differential pressure limit control may be needed, since at that point the blower compression ratio control takes over, and prevents the cabin differential from increasing, causing it rather to decrease.

As in prior applications, and particularly as disclosed in the Price Patent No. 2,208,554, the control may be such that at the lowest altitude range, from sea level to 8,000 feet, for example, the cabin pressure has only a slight differential above barometric pressure, due to restriction of the outflow, which is represented at $a$—$f$ or $b$—$g$. At some selected point, 8,000 feet as shown, represented at the point $g$, an absolute pressure control may automatically take over, as in the Price patent, and the cabin pressure may be maintained constant as represented by the isobaric graph $g$—$h$. At the point $h$ the absolute pressure control is automatically overridden, either by the differential pressure control to maintain the differential along the curve $h$—$j$, or by the blower pressure ratio control to maintain the blower compression ratio $h$—$n$. If the higher blower compression ratio is employed, the differential pressure control may take over from $h$ to $j$, and at $j$ the blower pressure ratio control automatically overrides the differential pressure control and maintains a decreasing cabin absolute pressure, never in excess of the blower compression ratio, as represented at $j$—$m$.

It will be quite understandable from the prior applications referred to above that between an upper limit such, for instance, as the line $k$—$j$—$h$ extended, and the barometric line $a$, $b$, $c$, $d$, $e$, the cabin pressure may be manipulated and controlled in any manner desired, but since the means for so doing have already been disclosed in these prior applications, it is not deemed necessary to set forth the manner of so doing in great detail in this application, since this application is concerned primarily with a system wherein there is an overriding blower compression ratio control regardless of what prior controls were provided. It will be observed, however, that the ratio control can be arranged to override a proportional control, such as $g$—$p$—$q$—$r$, wherein, as explained in our Patent No. 2,450,881, the relation $$\frac{hp}{pc} = \frac{sq}{qd}$$

is always maintained.

A representative system for accomplishing these ends is illustrated in Figure 6. Here the pressure cabin is diagrammatically represented at 9, having an outflow port 91, and having an inflow conduit 90, supplied by a blower 92. Since it is undesirable to maintain the blower operating at full capacity except along the line $j$—$m$, or $h$—$n$, or some equivalent line representing the blower compression ratio which is adopted, the blower is variable in speed, though driven from the propelling engine 93 by automatic means, represented generally at 94, and disclosed more fully in our application, Serial No. 415,603. This automatic device 94 operates through a change speed mechanism, such as a Waterbury hydraulic gear or equivalent mechanism, represented at 95a and 95b, which is controlled by a fluid piston and cylinder mechanism as shown to vary the speed of the blower 92, in accordance with a flow factor impressed upon the system at 96. Such flow factor is shown impressed on a differential pressure diaphragm type of control by static and Venturi tubes connected to the chamber at opposite sides of the diaphragm, and the diaphragm control in turn is connected to the valve for regulating the fluid piston and cylinder mechanism.

Coupled with this blower control is a pressure sensitive control regulating outflow through the port 91. A valve 1 is normally held somewhat upraised from a seat 97, and is movable towards and from this seat in accordance with certain automatic devices in order to control variably the outflow through the port 91.

The control devices comprise essentially a ratio control and at least one other pressure control, either an absolute-pressure device or a differential-pressure device, or both. As shown in Figure 6, the control is through an absolute-pressure device generally represented at 2, a differential-pressure device, generally represented at 3, and a ratio control 5. Movement of the valve is accomplished by an actuating piston represented at 4, which moves in accordance with the resultant of two pressures applied to its opposite faces.

Figure 9:
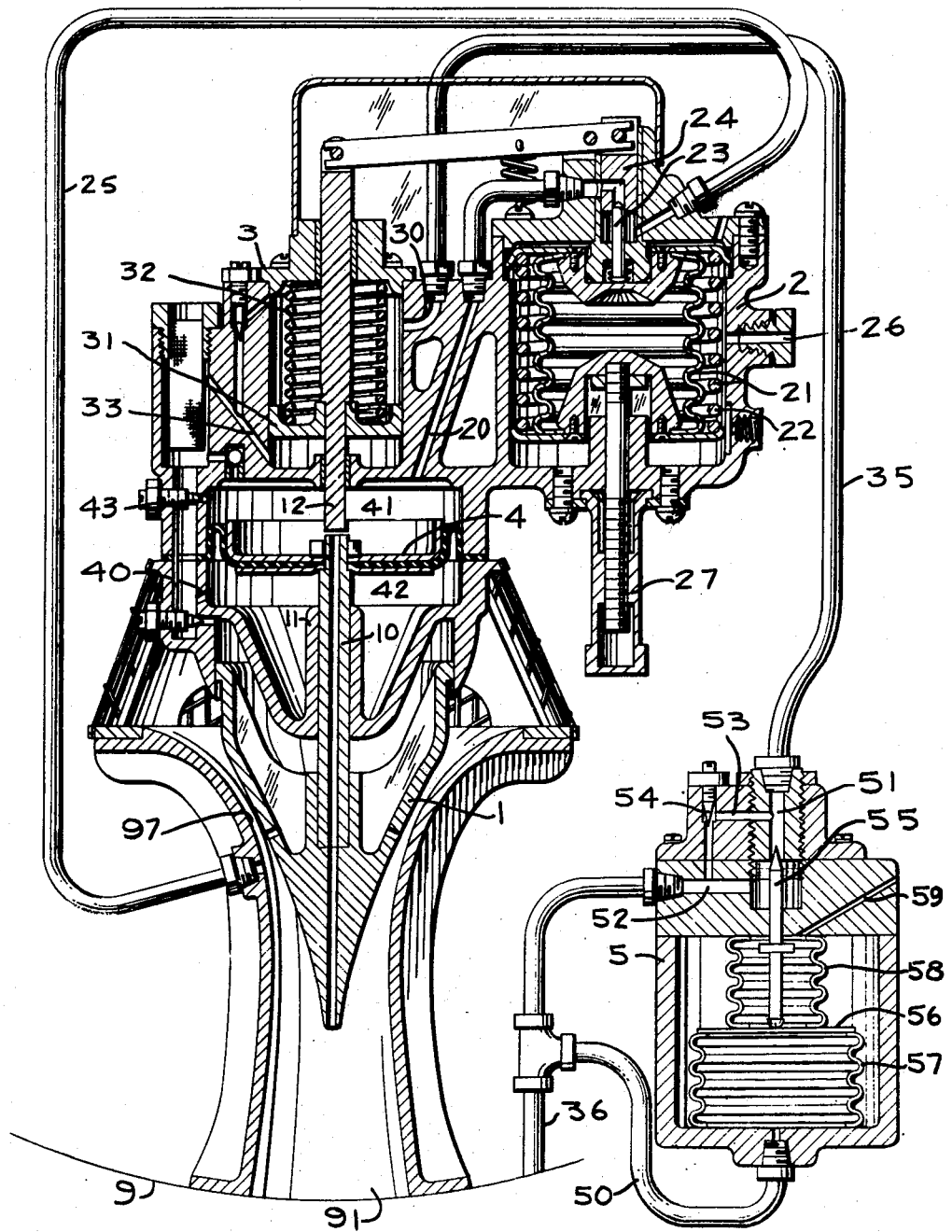
Figure 9 is a sectional view similar to Figure 1, showing a different type of ratio control applied to the known outflow control.

The ratio control illustrated in Figure 6 is that shown in greater detail in Figure 9, but as has been indicated, any suitable ratio control can be employed.

Referring now to Figure 9, the outflow control will be found substantially identical with that which is described in our Patent No. 2,450,881, issued October 12, 1948, and reference is made to that patent for a full description of the outflow control and its operation. For the purposes of this case, it is sufficient to describe it briefly.

The valve 1 is fixed upon the hollow stem 10 guided at 11 for vertical movement, and upon the upper end of this stem is valve actuating piston 4, which, with its diaphragm, divides the chamber enclosing it into two chambers 41 and 42. Cabin pressure is admitted to the chamber 42 by way of the port 40, and the effective pressure in the chamber 41 depends upon the freedom with which cabin pressure leaks past the metering valve 43, and leaks out through the hollow stem 10 to atmosphere. The latter is controlled by the spacing of the spindle 12 towards and from the end of the hollow stem 10, which spindle is under control of the differential-pressure device 3, and at another time may be under control of the ratio control 5.

For the purpose of absolute-pressure control there is an outlet passage 20 from the chamber 41, which leads to a region of low pressure through the absolute control device 2. It is the cumulative effect of pressure escaping through the stem 10, or the port 20, as it leaks in from the cabin past the valve 43, as opposed by the cabin pressure upon the under side of the piston 4, that is, within the chamber 42, which controls the position of the valve 1.

The absolute-pressure control comprises an evacuated bellows 21, collapse of which is resisted by a spring 22, which bellows controls an orifice pin or valve movable in conjunction with a shiftable orifice block 24. The relative movement of pin 23 and ported block 24 controls outflow through the passage 20, and thence by way of the duct 25 to a low-pressure region such as the Venturi throat formed between the seat 97 and the valve 1. The bellows 21 is subject exteriorly to cabin pressure through the port 26. It is so arranged that upon the attainment of a given pressure, for instance, 22 inches of mercury, corresponding to the atmospheric pressure at 8,000 feet, the device 2 will be automatically operated to maintain that cabin pressure constant. The point at which absolute pressure operation commences may be varied by the adjustment device represented at 27.

The differential-pressure device 3 includes a piston 31, slidable relative to the reduced lower end of the spindle 12. It is normally held in its lowermost position by the spring 32, and is acted upon at its lower side by cabin pressure communicating through the port 33; its upper side is connected to atmosphere by way of the port 30 and conduit 35. Upon the attainment of such a pressure difference at opposite sides of the piston 31 as will overcome the spring 32, the piston will rise until it engages the shoulder of the spindle 12, and it will cause the latter to rise and thereby to withdraw its lower end from the hollow stem 10. In so doing, the position of valve 1 will be altered, causing it to open slightly, and thereby causing the cabin pressure to drop. In this manner there will be retained a substantially constant differential pressure within the cabin, as the airplane moves throughout a high altitude range.

The operation of this differential pressure device 3 is dependent upon the maintenance or acquirement of a given pressure drop across the piston 31. If this pressure difference is disturbed, or altered, the effect is alteration of the differential pressure which is to be maintained. Alteration of the differential pressure under the control of a ratio device, or of a device operable in accordance with the ratio between cabin pressure and exterior pressure, may be considered in one aspect as adjusting the differential device by infinitesimal increments, and thereby effecting control in accordance with the pressure ratio, as desired.

Thus, if the conduit 35 is freely open to atmosphere, the upper side of piston 31 is affected by atmospheric pressure, and since its lower side, through the port 33, is affected by cabin pressure, it is a true differential pressure control. If, however, the conduit 35 is not connected directly and freely to atmosphere, but has a restriction in it, which restriction is variable in accordance with pressure ratio, then there is introduced a different pressure drop, in the line between the differential device 3 and the atmosphere, and consequently, by suitable choice of the strength of the spring 32, the device may be made to operate along a pressure ratio curve such as $j$—$m$, in Figure 10, following the blower compression ratio.

The conduit 35 communicates through the ratio control 5 with atmosphere at 36, either by way of the ports 51, 52, or by way of the by-pass port 53, in which is a metering valve 54. Between the ports 51 and 52 is also a metering valve 55, which is controllable under the influence of a ratio control, that is, a control which is subject to the cabin pressure and atmospheric pressure at a definite ratio, such as 3 to 1, if that is the selected blower compression ratio.

Thus, for instance, the lower end of the valve 55 bears upon a diaphragm 56, which closes the end of a large bellows 57. This bellows 57 is connected to atmosphere by way of the duct 50. The diaphragm 56, at its upper side, mounts a smaller bellows 58, the interior of which is in communication with cabin pressure by way of the port 59. The interior of the casing 5 is evacuated. If the area of the diaphragm 56 which is subjected to atmospheric pressure, is three times the area of that diaphragm which is subjected to cabin pressure, the two will be in equilibrium, within the evacuated casing 5, whenever atmospheric pressure is one-third of cabin pressure. If atmosphereic pressure is in excess of one-third of cabin pressure, the resultant of pressure on the diaphragm 56 urges the valve 55 upwardly to seat it in the end of passage 51, and all communication from 35 to 36 must be by way of the by-pass 53 and past the adjustable metering valve 54. Since the adjustment of this valve 54 is fixed, and creates a given pressure drop, the value of that pressure drop can be taken into account in initially adjusting the differential pressure device 3, and the latter may be made to operate at a differential pressure and with a pressure drop past its piston 31 which is less than the actual pressure drop between cabin and atmospheric pressures, by so much as is equivalent to the pressure drop past the valve 54.

Whenever the atmospheric pressure becomes so low, with relation to cabin pressure, that atmospheric pressure is less than one-third of cabin pressure, the total pressure on the upper side of diaphragm 56 is greater than the total pressure on the lower side of the diaphragm, and the valve 55 moves downwardly, opening communication between passages 51 and 52, and by so much lessening the pressure drop past the valve 54. This reacts in turn upon the differential-pressure device 3, and alters the setting of the valve 1; in effect, it causes further opening of the valve 1, that is, opening further than it would normally be opened by the differential-pressure device, with the result that cabin pressure drops more than it would drop if only the differential-pressure device were active, and hence, cabin pressure drops along a curve such as the characteristic curve $j$—$m$, or $h$—$n$.

Springs have not been shown, nor adjustments in connection with the bellows 57 and 58 and the ratio control 5, but such expedients may be used as necessary, and as will be obvious, and thereby the device may be made more sensitive, or its initial points and limits can be altered as required.

Figure 1:
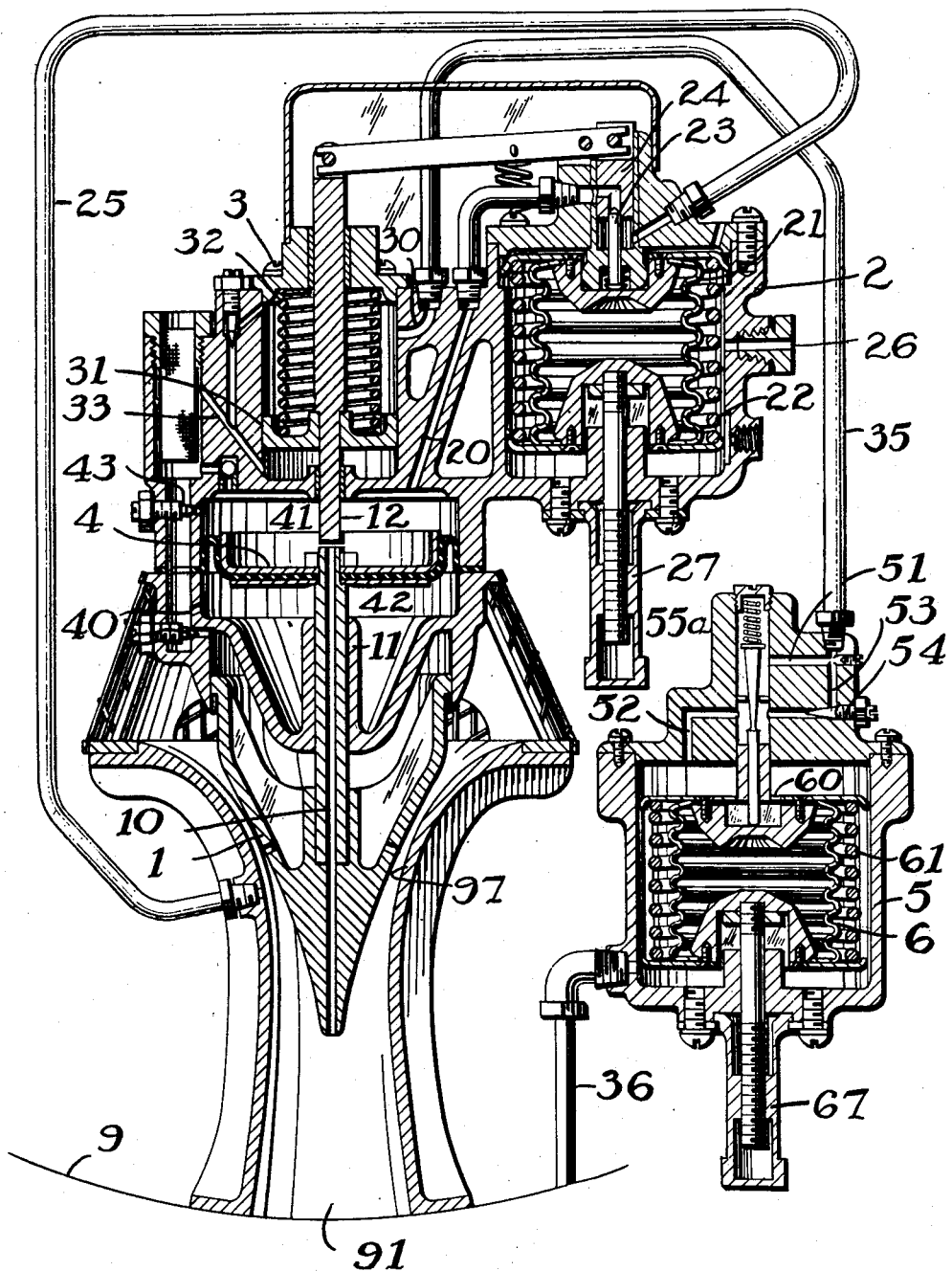
Figure 1 is a section through an outflow control unit or valve of known type, having an additional ratio control, likewise shown in section, of such type, and so arranged, as can be applied without substantial change in the control unit itself.

The arrangement of Figure 9 has been first described because it incorporates a true ratio control; that is, a control which is subject to a higher pressure over a smaller area and an opposed lower pressure over a larger area. The arrangement of Figure 1 is quite similar, except that in Figure 1 the ratio control device 5 is not, strictly speaking, a ratio control, but operates under the influence of an absolute pressure device, an evacuated bellows 6, which, however, is arranged to operate in accordance with, if not directly under the influence of, the ratio of cabin pressure to exterior pressure.

As with the arrangement previously described, a metering valve 54 is set to control communication through a by-pass 53 connecting the conduits 35 and 36, but communication between passages 51 and 52 is under control of a metering valve 55$a$ which is movable by the free end 60 of the evacuated bellows 6, and the opposed spring 61. The normal atmospheric pressure acting through 36 upon the evacuated bellows 6 will tend to hold the bellows collapsed in opposition to the spring 61 at all except the highest altitude range; for instance, above the point $j$ of Figure 10. When the bellows 6 is thus collapsed, the valve 55$a$ is closed and all communication between 35 and 36 is by way of the by-passage 53 past the valve 54 as before. However, when the airplane reaches the highest range, at some selected value, in accordance with the strength of the spring 61 and of the bellows 6, considered as a spring, the bellows tends to expand, and this opens the valve 55$a$. If the exterior pressure continues to decrease, the valve 55$a$ opens farther and farther, with the result, if parts are properly chosen and calibrated, that the cabin pressure decreases along the ratio curve such as $j—m$. This curve and its point of commencement can be varied by varying the position of the fixed end of the bellows 6 by an adjustment such as is indicated at 67.

Figure 2:
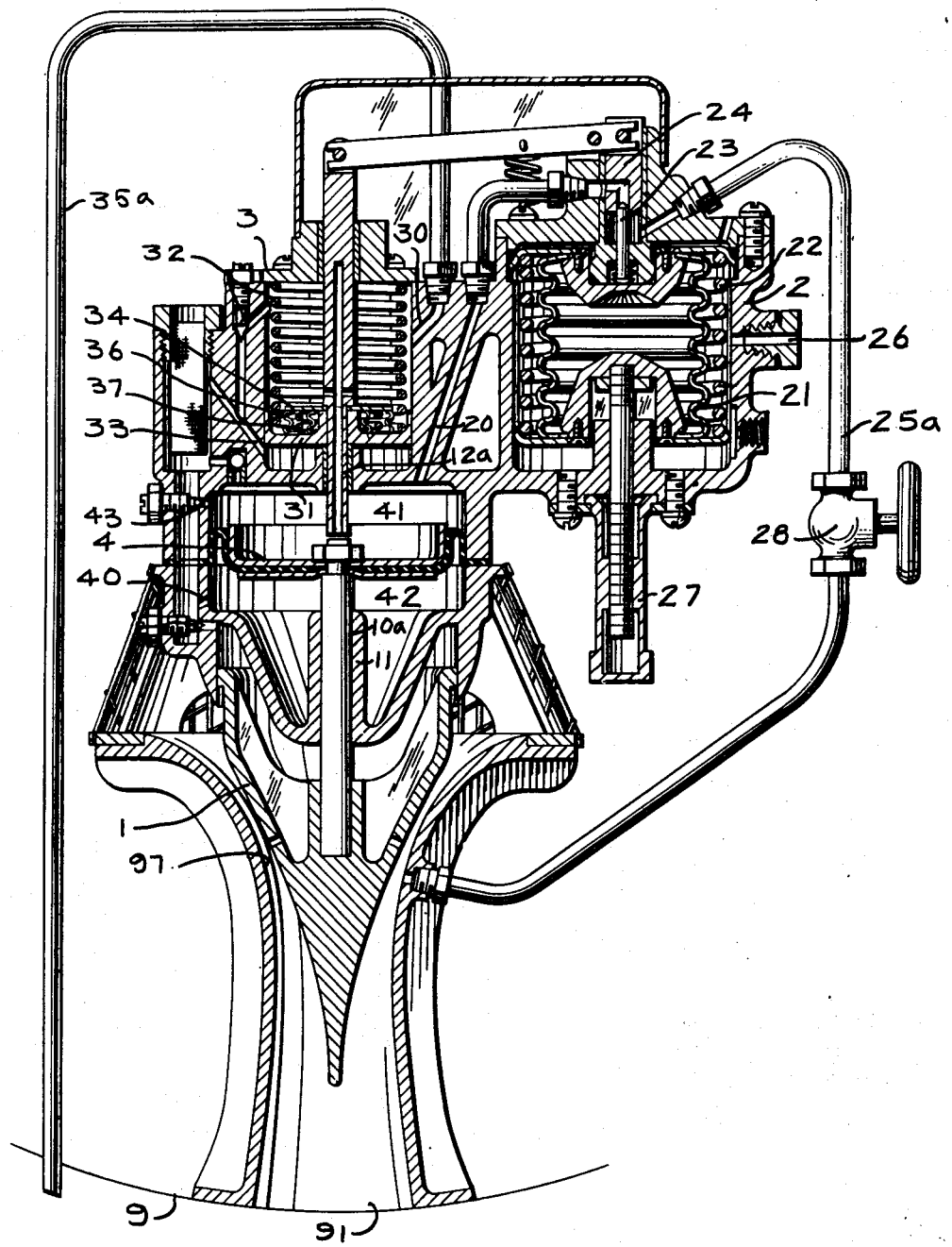
Figure 2 is a sectional view similar to Figure 1, showing the ratio control built into the control unit as a part of the differential control therein, and acting to modify that differential control.

The arrangement shown in Figure 2 is rather similar to those already described, particularly in that it shows an arrangement in which the known and existing control can be taken without reworking any part of it, and by merely alteration of the assembly or arrangement, or by the substitution of an assembly (in this instance, the differential-assembly, or an equivalent assembly in the existing control), the existing control may be furnished with a ratio control.

Figure 2 illustrates an alternate way of affording communication between the low-pressure chamber 41 and a low-pressure region. In this the valve stem 10a is not hollow, but instead the spindle 12a is hollow, affording communication thereby from the chamber 41 to atmosphere through the chamber at the upper side of the piston 31, and thence via the passage 30 and the conduit 35a, which latter extends direct to atmosphere. The absolute-pressure control 2 is also the same as has been described, save that it has a valve 28 included in the low-pressure line 25a.

The valve 28 may be normally open, so that there is no obstruction in the line 25a. However, if the absolute pressure device 2 should fail to operate properly, it can be cut out by closing the valve 28, which leaves the limiting differential-pressure sensitive device 3 still fully operable to prevent the cabin pressure exceeding the predetermined difference over exterior pressure, and then by suitable means the pressure supply can be augmented or manually controlled, if necessary, to supply adequate pressure within the cabin.

Interposed between the piston 31 of the differential pressure control 3 and the shoulder of the stem 12a, is what is, in effect, a diaphragm 34, acted upon by an evacuated bellows 36 and a spring 37. Normally the evacuated bellows 36 is held collapsed by atmospheric pressure communicating through the passage 35a and port 30. Upon decrease of the atmospheric pressure, however, at the highest altitude range, that is, above the point $j$, for example, the spring 37 gains the ascendency and expands the bellows to raise diaphragm 34. Since this only occurs after the device has been operated under differential control for a time, that is, from $h$ to $j$, the effect of this relative upward movement of the diaphragm 34 is to accelerate the rate of upward movement of the spindle 12a, hence the rate of opening of the valve 1. The effect of this is to cause decrease of absolute cabin pressure at a higher rate, and by proper choice and arrangement and adjustment of the parts, this decrease of cabin pressure, while not, strictly speaking, under ratio control, operates in accordance with the ratio of cabin pressure to exterior pressure.

Figure 3:
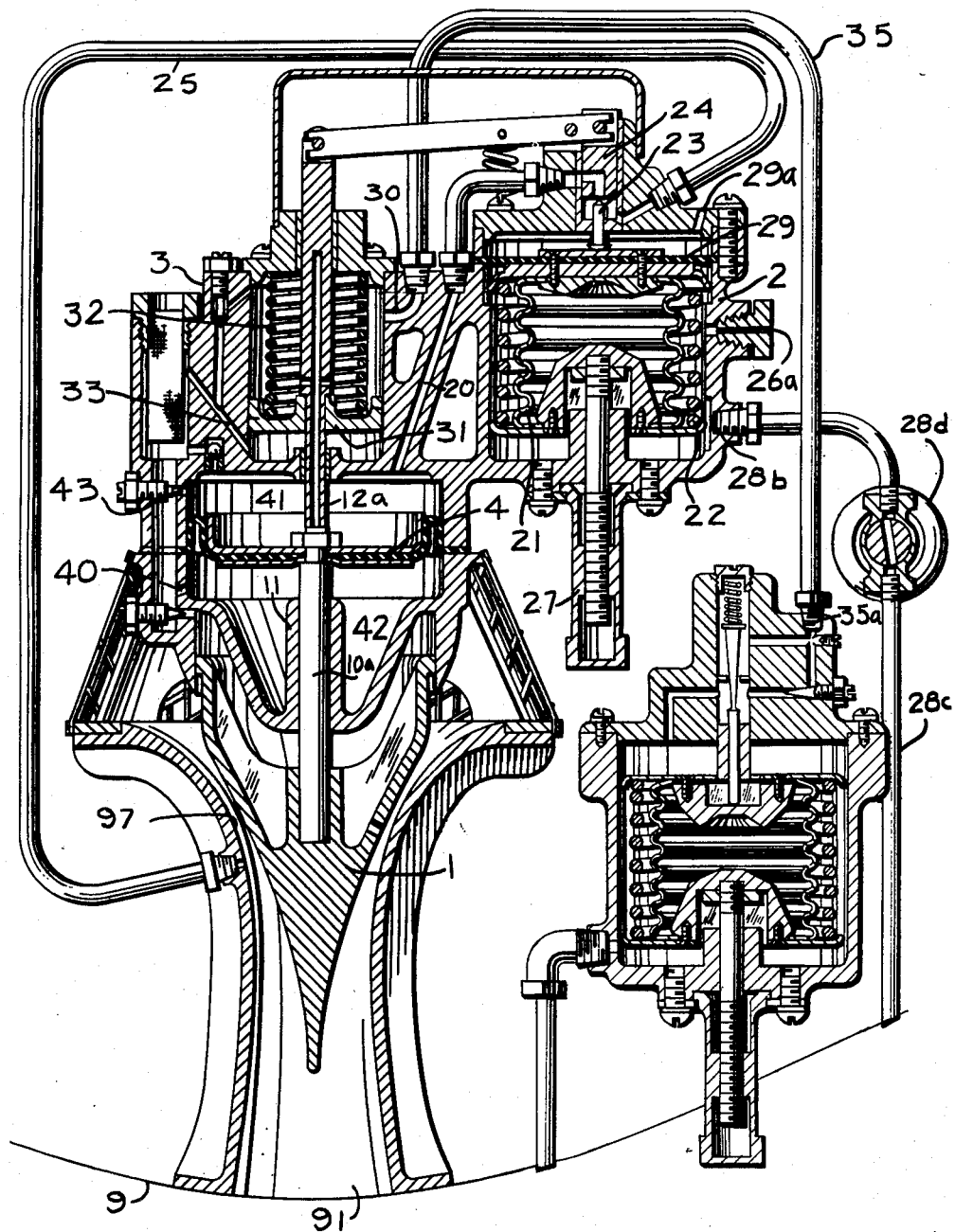
Figure 3 is a sectional view similar to Figure 1, but showing a somewhat modified form of the control unit, with a ratio control attached thereto of the type shown in Figure 1.

In the arrangements heretofore described, except for the adjustment at 27, which was intended to vary the point at atmospheric pressure at which isobaric regulation commenced, or except for adjustment of the tension of the spring 32 in the differential control, which would vary the value of the differential to be maintained, the devices have been such as were intended to follow the general curve at $g, h, j, m$, of Figure 10. However, it may be desired in some instances to maintain a cabin pressure either from sea level or from some datum pressure at a higher altitude, which bears the relationship of a fixed fraction above or percentage of the difference between sea level (or the arbitrarily selected datum pressure) and actual atmospheric pressure. For instance, it may be desired that cabin pressure be maintained always half way between atmospheric pressure and sea level pressure, or half way between atmospheric pressure and the pressure at 8,000 feet, for instance along the line $g—p—q—r$. Such an arrangement can be accomplished by the device illustrated in Figure 3. Nevertheless, it is necessary to place a limit on the absolute cabin pressure, for, with such a proportional arrangement, the cabin absolute pressure may still exceed that which the maximum blower compression ratio can maintain at some high altitude, and it is therefore still necessary to insure that the ratio control will override all other controls.

Since the ratio control has been described in conjunction with Figure 1, no further detailed description thereof appears necessary. The main control differs from that heretofore described primarily in that the casing 2 is divided by a diaphragm 29 into an upper and a lower chamber; the upper chamber is always subject to cabin pressure by way of the port 29a, whereas the lower chamber, by a suitable adapter plug containing the bleed port 26a, is permitted restricted communication with cabin pressure. The port 26a functions as a small fixed orifice, but is exaggerated in the drawing. At 28b is connected a tube which affords communication between the lower chamber of the casing 2 and the exterior atmosphere, by way of the adjustable metering valve 28a, as for instance by way of the tube 28c.

The passage 20 is in communication with a low-pressure source through the adjustably mounted orifice block 24 and the orifice pin or valve 23, the head whereof rests upon and is moved by the diaphragm 29. The relative positions of the pin 23 and orifice block 24 control communication of passage 20 with a low-pressure source, for instance that low pressure existing at the throat of the Venturi orifice past the valve 1 and its seat 97 by means of the conduit 25. The valve 28a functions as a variable orifice related to the normally smaller fixed orifice 26a. The relation of absolute cabin pressure to sea level pressure, or to some other datum pressure, and to atmospheric pressure, may be made to depend upon the size of the variable orifice, that is, upon the adjustment of the relative sizes of the orifice 26a and valve 28a. If the valve 28a, the variable orifice, is completely closed, the situation is as though the orifice 28a did not exist, and the device will function substantially the same as has been described in conjunction with the previous figures. With valve 28a closed, as in those figures, in effect the cabin pressure only is impressed upon the bottom and upon the top of the diaphragm 29, and the bellows 21 functions in response to removal of a collapsing force opposing its spring 22, to initiate cabin supercharging, and to maintain cabin pressure. The cabin pressure will follow or parallel the atmospheric curve from $f$ to $g$, then regulation is isobaric from $g$ to $h$, and after the limiting differential is reached the differential curve $h—j—k$ is followed, or tends to be followed. However, the ratio control will take over at the point $j$, and the pressure curve thereafter will be along the line $j—m$. This is not the manner of operation which is primarily intended for this modified structure, but it illustrates how this structure can still operate in a manner wholly analogous to the structure previously described, while still possessing additional capabilities.

If the valve orifice at 28a is fully open, the chamber within the casing 2 and beneath the diaphragm 29 is nearly at atmospheric pressure, even though cabin pressure enters at 26a, for the fully opened orifice 28a is so much larger than the orifice 26a that cabin pressure entering this chamber at 26a is exhausted immediately by way of tube 35a and its effect is negligible. It follows that there is a downward force over the whole of the area of the diaphragm 29 which is the cabin pressure times the diaphragm area, and that there is an equivalent opposing upward force equal to the fixed force of the spring 22, plus the force of the bellows 21, (considered as a spring) plus the atmospheric pressure over the annular diaphragm area outside the bellows 21, which latter, it will be remembered, is evacuated. These opposed forces can be so balanced that the atmospheric curve is departed from at any predetermined altitude by suitable adjustment of the spring force at 27.

To attain a pressure intermediate the isobaric curve $g—h$, and the atmospheric curve, from $b$ to $c$, it is only necessary to partially close the valve or adjustable orifice 28a to some point intermediate fully closed and fully opened position. By so doing, it is clear that with increasing closure of valve 28a the escape of pressure from the lower chamber within the casing 2 is increasingly slower, and that there is a corresponding increase in the upwardly acting forces on the diaphragm 29. The result of this is to maintain the cabin pressure, not at a constant or isobaric value, not at atmospheric, but at some intermediate value, perhaps halfway between such as represented by curve $g—r$, at all altitudes within this range, and indeed, within a further range of higher altitude until some overriding control, for instance, the differential control, or the ratio control, overcomes the tendency to increase cabin absolute pressure.

Figure 4:
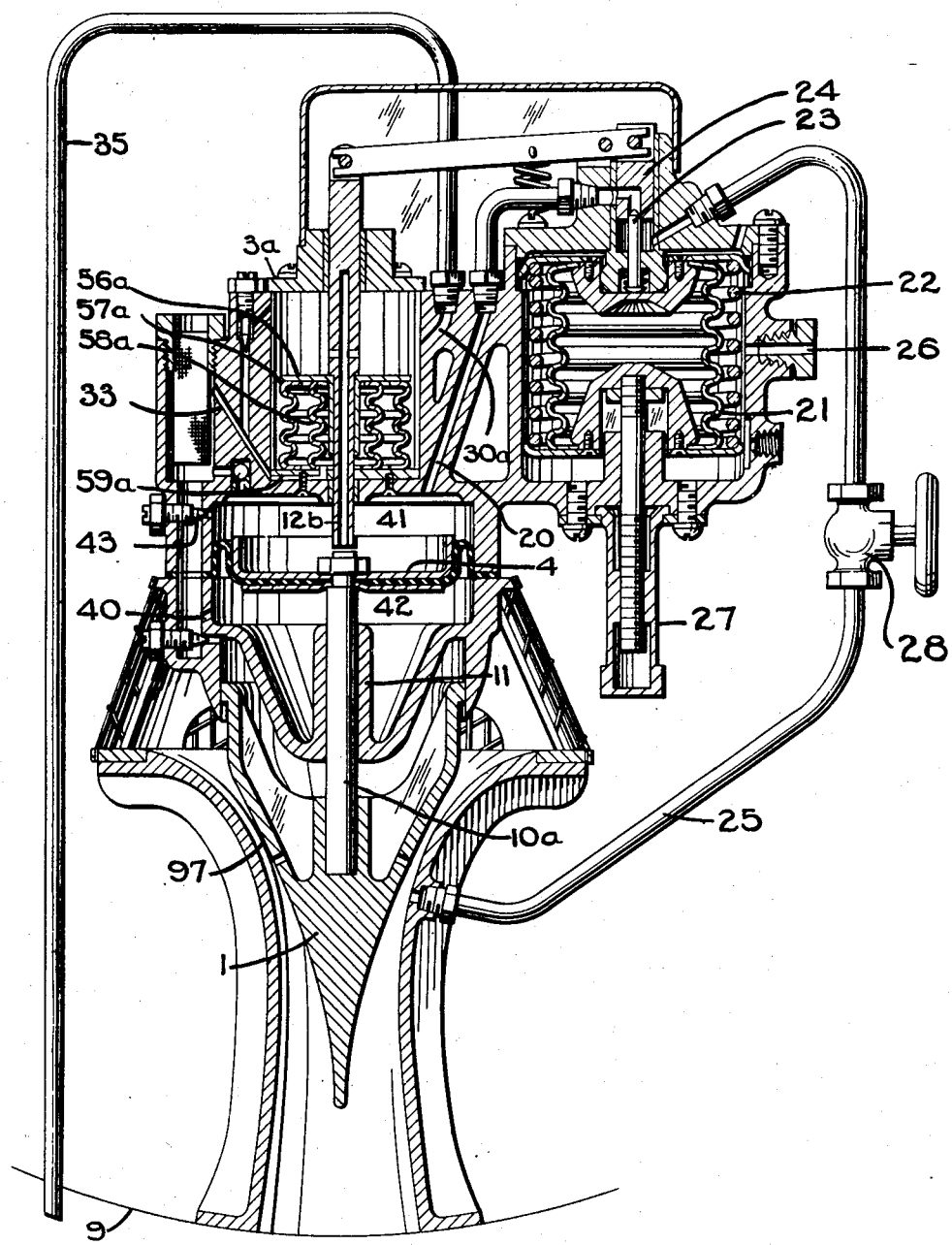
Figure 4 is a sectional view similar to Figure 2, showing a different type of ratio control built into the known outflow control unit.

The arrangement shown in Figure 4 is somewhat analogous to that of Figure 2 except that the ratio control instead of being associated with the differential control, and modifying the action of the latter actually replaces the differential control. However, the size of the ratio control will probably be such that the unit as a whole will have to be modified in construction to some degree to incorporate the ratio control. The arrangement of Figure 4 also differs from that of Figure 2 in that while the device of Figure 2 operates in accordance with the ratio of cabin pressure to atmospheric pressure, the control is through an absolute pressure control or evacuated bellows rather than a true ratio control, whereas the arrangement shown in Figure 4 is a true ratio control, involving atmospheric pressure applied over a large area opposed by cabin pressure acting over a smaller area; the two areas being such that until a low atmospheric pressure is reached, the total pressure applied by the atmosphere in opposition to the higher cabin pressure over the smaller area will be the greater, and the atmospheric pressure will maintain the bellows device collapsed.

The arrangement shown in Figure 4 differs also from the previously described arrangement in that there is no differential-pressure control, but rather the ratio control takes over and overrides the absolute-pressure control.

The ratio control, then, is incorporated within the casing 3a, and acts upon the spindle 12b. A platform 56a is acted upon, over its upper face, by atmospheric pressure communicating through the port 30a. On its under side the diaphragm 56a has applied to it an evacuated bellows 57a, and within that is a bellows 58a, which is in communication with cabin pressure by way of the port 59a.

So long as atmospheric pressure over the whole area of diaphragm 56a is greater than the cabin pressure over the much smaller area within the bellows 58a, the diaphragm 56a will remain below the shoulder of the stem 12b. When the cabin pressure, by reason of its relative increase in ratio to atmospheric pressure (though it drops in absolute value), becomes sufficiently high it raises the diaphragm 56a, hence by engagement with the shoulder it raises the spindle 12b and causes the valve 1 to be opened more widely, thereby reducing cabin pressure, the reduction being in ratio corresponding to the blower compression ratio.

The arrangement thus described will operate along such a line as $h—n$, in Figure 10, and no differential control will become operative, and none need be provided.

Figure 5:
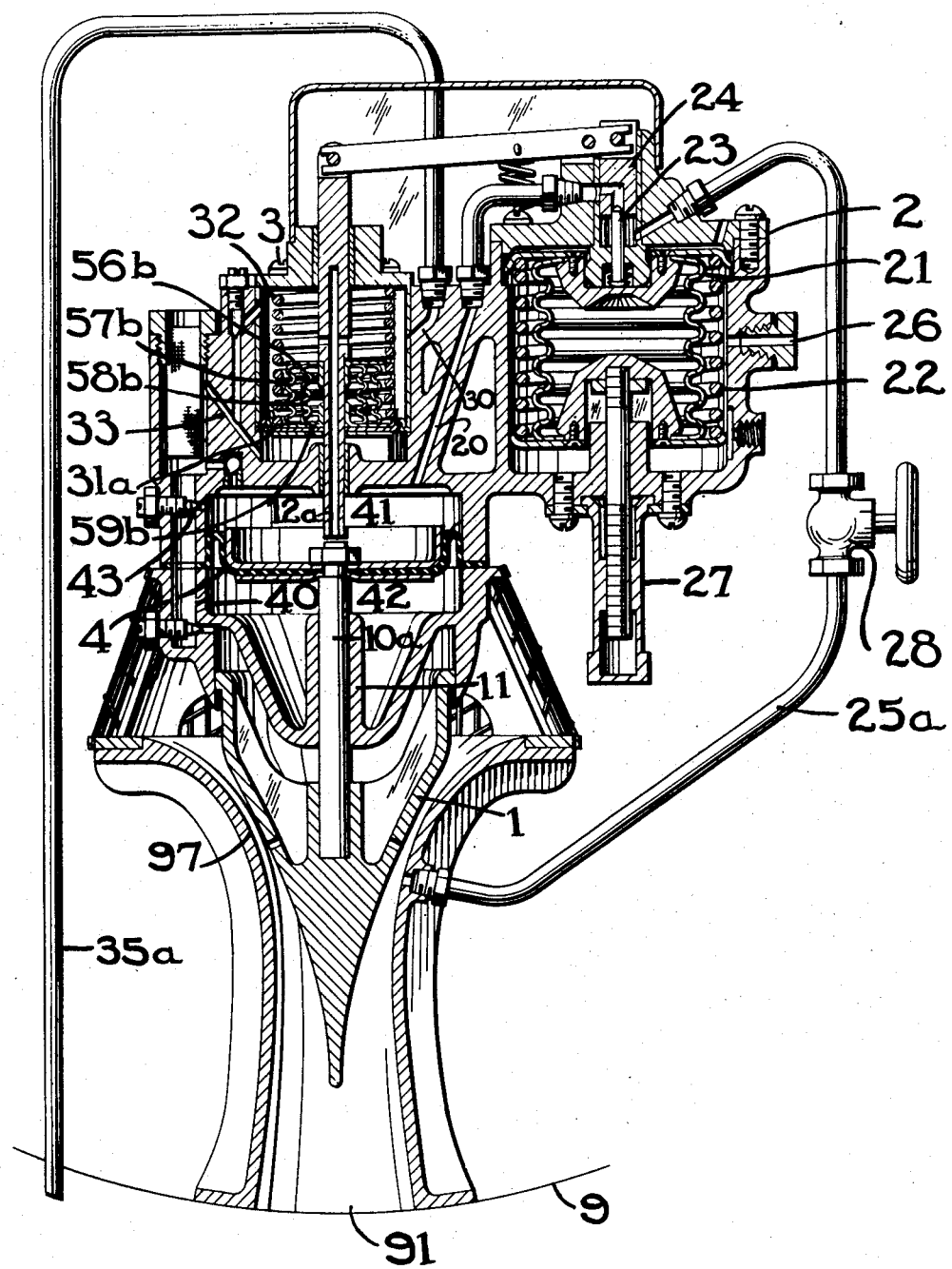
Figure 5 is a sectional view which represents a further modification similar to Figures 2 and 4.

Figure 5, however, includes a differential control as well as a ratio control in conjunction therewith. It is comparable with Figure 4, but as stated, includes also the differential control of the previous forms. The diaphragm 31a operates in all respects similarly to the diaphragm 31 in the differential pressure sensitive device of the other forms. When the selected differential for which it is set has been attained, the diaphragm 31a will commence to rise, and a shoulder movable with it will contact with the shoulder of the stem 12a and raise the latter. However, the shoulder which moves with the diaphragm 31a is in this instance movable also and additionally under the influence of ratio control, but does not commence to operate under ratio control until after there has been a period of differential control. In other words, the operation is first along the line $h—j$, as though there were no ratio control, but when the ratio control commences to operate, the operation is along the line $j—m$ of Figure 10.

The diaphragm 56b is the element movable with the diaphragm 31a which engages the shoulder of the spindle 12a. It is supported from the diaphragm 31a by an evacuated bellows 57b and a smaller bellows 58b inside the bellows 57b, which bellows 58b is in communication with cabin pressure through the vent 59b.

The operation should now be apparent. The normal absolute-pressure operation under the influence of the device 2 occurs at medium altitudes, differential operation under the influence of the device 3 occurs at high altitudes, and at the highest altitude range the pressure within the bellows 58b pushes upward the diaphragm 56b with relation to the diaphragm 51a, and operation thenceforward is under the influence of the ratio control.

Figure 8:
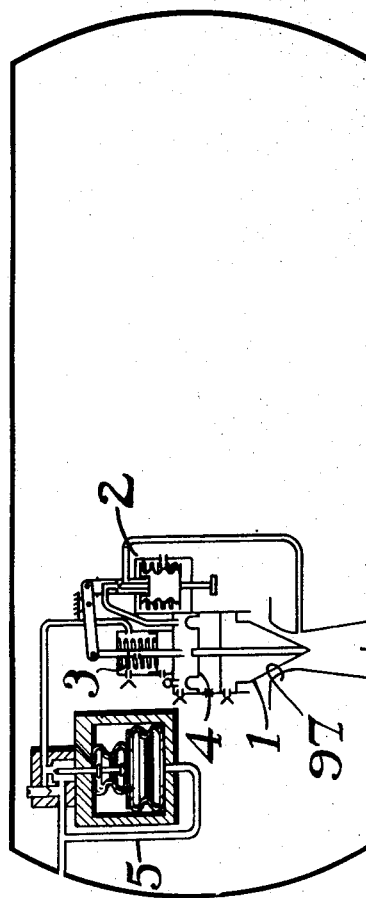
Figure 8 is a similar sectional view showing a somewhat reversed manner of application to the absolute pressure control.

In the arrangement heretofore described the ratio control has been connected to the differential control to modify the operation of the latter. In effect the operation has taken place by progressively decreasing the differential-pressure limit by infinitesimal increments. In Figures 7 and 8 the ratio control is shown in conjunction with and modifying the action of the absolute pressure control. In effect in those figures the operation takes place by modifying through infinitesimal increments the absolute-pressure limit.

Referring first to Figure 7, it will be understood that the absolute-pressure device, though modified by the inclusion of a ratio-sensitive device, will operate normally in all ways because in the range of isobaric regulation, that is, the medium altitude range, there is usually no need of ratio control, and the latter is inactive, and conversely, in the highest altitude range, under ratio control, the absolute pressure control has previously become inactive. In effect, during absolute-pressure operation, the orifice pin 23 moves directly with and under the influence of the absolute-pressure sensitive bellows 21, although the head of the pin rests upon an intermediate floating diaphragm 56c, which is part of the ratio control, and which in turn is supported from the head 21a of the bellows 21 to move with the latter by means of a bellows 57c which communicates with atmosphere through a passage 50c, connecting finally through a flexible tube to the interior of the bellows 57c. The upper side of the diaphragm 56c supports an evacuated bellows 5c, enclosing a bellows wall 58c which is open to cabin pressure through the port 29a. A spring 23c acts upon the head of the pin 23 and holds it down against the diaphragm 56c. Struts 5d are secured to the upper end of bellows 5c, to space this end definitely from the head 21a, and to leave the diaphragm 56c free to shift relative to the head 21a when operating under ratio control. Spacers 5e limit upward movement of the diaphragm 56c and of the pin 23 (except as the head 21a moves upwardly) at altitudes below that at which ratio control becomes effective.

Under ratio control, of course, the diaphragm 56c and pin 23 tend to move downwardly relative to the orifice block 24.

When the pressure acting downwardly within the bellows 58c on the diaphragm 56c overcomes the upwardly acting atmospheric pressure on the same diaphragm within the bellows 57c (which occurs when cabin pressure on this area exceeds the selected ratio to atmospheric pressure), the pin 23 will be moved downwardly with respect to the orifice block 24, and while the port in this block 24 was previously closed completely during the range of differential operation, this port now begins to open as the pin 23 is withdrawn, and the result is that pressure is permitted to escape more freely from the chamber 41 (see Figure 1 or 2), thereby moving the valve 1 upwardly, and in the same degree reducing cabin absolute pressure by infinitesimal increments, in strict accordance with the ratio between cabin pressure and atmospheric pressure.

Figure 8 is an arrangement similar to Figure 7, somewhat reversed. In Figure 8 the normal arrangement of the orifice block 24 and orifice pin 23 are unchanged, but a further metering valve 23d is arranged for movement relative to its port 24d, which communicates by the passage 20d with the passage 20 on one side, and its other side communicates by the passage 25d with the conduit 25a and thence to atmosphere, or a similar low pressure region. The pin 23d is acted upon in opposition to its spring 23c by a ratio-sensitive device consisting of the diaphragm 56d, in communication with the atmosphere by the conduit 50d, and the movement of diaphragm 56d is under control of the ratio of the pressure of the atmosphere, acting over its full lower face, and cabin pressure through the port 59d acting upon the interior of the small bellows 58d; the surrounding bellows 57d is evacuated.

The absolute control operates as previously described, and ceases operation when the differential control takes over. The differential control operates until such time as the forces are equalized on opposite sides of the diaphragm 56d, and the latter begins to move downwardly. Downward movement of the diaphragm 56d causes downward movement of the metering pin 23d, relative to its port 24d, and thereby is established communication between the chamber 41 by way of the port 20, and tube 20d and the atmosphere by way of the port 25d and tube 25a. The diaphragm 4 is thus moved upwardly, entraining consequent upward movement of the valve 1, and reduction of cabin pressure.

To recapitulate, it is pointed out that the ratio control may be strictly operative under the influence of the ratio of cabin pressure over a small area in opposition to atmospheric pressure over a larger area, or it may be operable in accordance with, but not strictly under the influence of, ratio control. For instance, it may be operable under the influence of an evacuated bellows, which effects the metering control in accordance with exterior pressure, and in effect operates in accordance with the ratio of the two pressures. The ratio control may operate upon the differential control or upon the absolute control. It may be a device built into the present control unit, or applied directly thereto, or it may require some reorganization and re-design of the pressure control unit. The ratio control overrides all other controls, whether the precedingly operable control be the differential control, as it normally is, or the absolute-pressure control; and in the latter case, regardless of whether there is or is not a differential-pressure control. The ratio control can also operate in conjunction with a proportional control in which cabin pressure is kept at some given ratio or proportion between a datum pressure and atmospheric pressure.

In effect, then, the ratio control is a further control which can be used in conjunction with any previous control device, and which superimposes a final control for the highest altitudes, operable in a manner to prevent the cabin pressure tending to exceed an absolute value greater than a given ratio to the exterior atmospheric pressure.

What we claim as our invention is:

1. Means to regulate aircraft cabin pressure comprising an outflow valve, an evacuated bellows responsive to cabin pressure having a free end and a support resisting movement of its other end, means engageable by the free end of the bellows normally to control said valve in accordance with axial movement of such free end as the length of such bellows varies in response to changes in cabin pressure, and means acting in accordance with the ratio of cabin air pressure to atmospheric pressure to shift the free end of the bellows relative to its support, and by consequent movement of the valve to effect control of cabin air pressure to prevent the ratio of cabin air pressure to atmospheric pressure exceeding a selected value.

2. Mechanism as in claim 1, wherein the bellows are responsive solely to cabin air pressure, and the means to shift the free end of the bellows thereby effects automatic adjustment of the cabin air pressure by successive increments.

3. Mechanism to control flow of air through an aircraft cabin, comprising means operable to supply within the cabin atmospheric air compressed at a selected maximum compression ratio, a valve movable to control flow of air through the cabin, means operable to move said valve for maintaining a pressure difference of cabin pressure over atmospheric pressure such that the ratio of cabin pressure to atmospheric pressure will never tend to exceed such selected maximum compression ratio of said air supply means, for supply to the cabin of a substantial quantity of air at all flight altitudes, and means controlling said air supply means for decreasing the degree of compression of air supplied thereby at ratios of cabin pressure to atmospheric pressure substantially less than such selected maximum compression ratio.

4. Mechanism to control flow of air through an aircraft cabin, comprising a valve, a pressure-operated actuator operatively connected to said valve, passages affording communication between a relatively high air pressure region and said actuator and between said actuator and a low air pressure region at a pressure substantially lower than that of such high air pressure region for flow of air through said actuator, and a ratio control unit including a casing interposed in one of said passages, a control valve for controlling flow of air through said casing and actuator between such high pressure region and such low pressure region, and a bellows variable in accordance with substantially a predetermined ratio of cabin air pressure to atmospheric pressure over a selected altitude range and operatively connected to move said control valve for governing said actuator to move said first valve for maintaining a corresponding ratio of cabin air pressure to atmospheric pressure.

5. Mechanism to control flow of air through an aircraft cabin, comprising a valve, a pressure-operated actuator operatively connected to said valve, passages affording communication between a relatively high air pressure region and said actuator and between said actuator and a low air pressure region at a pressure substantially lower than that of such high air pressure region for flow of air through said actuator, and a ratio control unit including a casing interposed in one of said passages, a control valve for controlling flow of air through said casing and actuator between such high pressure region and such low pressure region, and a diaphragm having an area of one side subjected to cabin air pressure and a larger area of its opposite side subjected to atmospheric pressure, the ratio of such areas corresponding to a selected cabin air pressure to atmospheric pressure ratio, said diaphragm being operatively connected to move said control valve for governing said actuator to move said first valve for maintaining a corresponding ratio of cabin air pressure to atmospheric pressure.

6. Mechanism to control aircraft cabin pressure comprising a valve, a pressure-operated actuator operatively connected to said valve, passages affording communication between a relatively high air pressure region and said actuator and between said actuator and a low air pressure region at a pressure substantially lower than that of such high air pressure region, an absolute pressure control operable to control communication through such passages from such high pressure region through said actuator to the low pressure region, thus to effect elevation of cabin air pressure above atmospheric pressure, a differential control operable to limit the effect of said absolute pressure control on the communication from the high air pressure region through said actuator to the low air pressure region, thus to limit the air pressure difference affecting said actuator, and a ratio control responsive to a selected ratio of cabin air pressure to atmospheric pressure, and operable to override said absolute pressure control and said differential pressure control to alter communication from the high air pressure region through said actuator to the low air pressure region in accordance with such ratio, and thereby to effect movement of the valve to prevent such ratio being exceeded.

7. Mechanism to control aircraft cabin pressure comprising a valve, a stem, the valve and stem being shiftable conjointly, a diaphragm secured on the stem, a casing enclosing the diaphragm and divided thereby into two chambers, one of which communicates with cabin pressure, tending to open the valve, two alternate passages leading from the other chamber to the atmosphere, and when in communication therewith decreasing the pressure in such other chamber below cabin pressure and thereby assisting to open the valve, two alternative pressure-sensitive devices, one of said pressure-sensitive devices being responsive to the difference of cabin air pressure over atmospheric pressure and arranged to open one of such alternate passages at a selected value of such pressure difference, to prevent such value of pressure difference being exceeded, the other pressure-sensitive device being subject to cabin air pressure, and arranged to regulate the opening through the other of such alternate passages to effect increase of cabin air pressure over atmospheric pressure, and a third pressure-sensitive device responsive to cabin air pressure and to atmospheric pressure, arranged in one of said alternate passages and operable to open the same for increasing the communication between such other chamber and the atmosphere to prevent a selected ratio of cabin air pressure to atmospheric pressure being exceeded.

8. The combination of claim 7, wherein the third pressure-sensitive device is connected in that alternate passage regulated by the pressure sensitive device subject to cabin air pressure.

9. Mechanism to control ventilation through and pressure within an aircraft cabin, comprising a blower operable to supply atmospheric air to the aircraft cabin continuously at a selected maximum compression ratio, an outflow valve open at all atmospheric pressures for continuous outflow of air from the cabin, pressure sensitive means subjected to the differential between cabin air pressure and a pressure lower than cabin air pressure and operatively connected to said valve to vary its opening, and thereby to maintain cabin air pressure elevated above atmospheric pressure, further pressure sensitive means subjected to atmospheric pressure and to an opposing force, operatively connected to said valve and operable to override the action of said first pressure sensitive means and control said outflow valve to prevent the ratio of cabin air pressure to atmospheric pressure exceeding such selected maximum compression ratio of said blower, flow responsive means responsive to flow of air through the blower to the aircraft cabin, and means controlled by said flow-responsive means and operable, while said first pressure sensitive means are effecting control of said outflow valve and prior to said first pressure sensitive means being overridden by said further pressure sensitive means, to effect operation of said blower at a compression ratio lower than its selected maximum compression ratio, to supply adequate air flow through the cabin at all altitudes without excessive power absorption by said blower.

10. A system for the control of pressure within an aircraft cabin, comprising a blower having a selected maximum compression ratio adequate to supply a desired cabin pressure at a selected altitude, connected to discharge air within the cabin, means subjected to the differential between cabin air pressure and a pressure lower than cabin air pressure and operable to control outflow from the cabin to create a difference of cabin pressure over atmospheric pressure increasing progressively as the altitude increases, means sensitive to flow of air through the cabin to increase the speed of the blower as the ratio of cabin air pressure to atmospheric pressure increases during a climb, and means independent of the blower and including pressure sensitive means subjected to atmospheric pressure and to an opposing force, operable to open said outflow control means during a climb for restricting the ratio of cabin air pressure to atmospheric pressure to a value at least as low as the selected maximum blower compression ratio.

11. Mechanism to regulate aircraft cabin pressure, comprising means to supply air under pressure within the cabin, an outflow valve, pneumatic actuating means operable under the influence of an air pressure difference and operatively connected to the valve to control the opening thereof, pressure responsive control means operable to vary the pressure acting on said pneumatic actuating means for controlling the opening of said outflow valve to establish cabin air pressure at a value higher than atmospheric pressure, and further pressure responsive control means communicable with the cabin and with the atmosphere and operative to override said first pressure responsive control means and to alter the pressure to which said pneumatic actuating means is subjected and thereby to control said outflow valve automatically to prevent the ratio of cabin air pressure to atmospheric pressure exceeding a selected ratio.

12. Mechanism to control flow of air through an aircraft cabin, comprising a valve movable to control flow of air through the cabin, and means operable to move said valve, including a member having an area of one side subjected to cabin air pressure and a larger area of its opposite side subjected to atmospheric pressure, the ratio of such areas corresponding to a selected cabin air pressure to atmospheric pressure ratio, and means operatively connecting said member to said valve to move the same for maintaining such a pressure difference of cabin air pressure over atmospheric pressure as not to exceed such selected ratio of cabin air pressure to atmospheric pressure.

13. In a control valve for controlling the relationship of fluid pressures within a container to pressures outside the same, a first pressure responsive means subjected to internal pressure and movable in one direction in response to increase thereof, a second pressure responsive means subjected oppositely to internal and external pressures and movable in one direction in response to increase in the differential of internal over external pressure, a third pressure responsive means subjected to external pressure and to internal pressure and movable in one direction in response to decrease of external pressure, valve means controlling the flow of fluid between the interior and exterior of the container, and pneumatic operating means to operate the valve means from said pressure responsive means, said operating means including conduits to subject the valve means to operation by the first or the second pressure responsive means, independently of each other so that the valve means responds to the first pressure responsive means so long as the resulting internal pressure does not exceed external pressure by more than the maximum differential, and then responds to the second pressure responsive means, and said operating means including a connection to cause the third pressure responsive means to act in opposition to the moving force of the first pressure responsive means to effect a maximum ratio of internal to external pressure and to operate the valve means when the ratio of internal pressure to external pressure tends to exceed said maximum.

14. In a cabin pressure controlling mechanism, a valve movable to control the pressure in a cabin whose pressure is to be controlled, air pressure differential operated actuating means for said valve, means for subjecting one side of said actuating means to the pressures in the cabin, means providing a chamber communicating with the other side of said actuating means, means providing a connection with a point outside said cabin, a valve for controlling communication between said connection-providing means and said chamber, means providing a continuous restricted communication between said chamber and the cabin whose pressure is to be controlled, actuating means for said last-mentioned valve including a bellows device comprising inner and outer bellows elements and means cooperating with said elements to enclose a chamber between them and to provide an end closure for the space surrounded by the smaller bellows, the space between said bellows being evacuated, and means for subjecting the space within the inner bellows element and the space outside of said outer bellows element respectively to cabin and to outside-the-cabin pressures.

15. In aircraft cabin control valve mechanism, a valve seat, a valve movable relative to said seat, an expansible chamber device for actuating said valve, a pilot valve for controlling the flow of fluid relative to said expansible chamber device and received within said expansible chamber device, a pair of concentric bellows having the space therebetween sealed and evacuated, the interior of the inner bellows being subjected to pressures within the cabin and the exterior of the outer bellows being subjected to reduced pressure, and means operatively connecting said bellows to said pilot valve for moving the same.

16. In a cabin pressure control mechanism, a cabin vent valve, an air pressure differential operated actuating device for said vent valve, and controlling means for said actuating device including a plurality of pilot valves each having a valve seat, a passage controlled by each pilot valve cooperating with its seat and connected with the outer air, a chamber into which said passages open and which communicates with said actuating device, means establishing communication between said actuating device and the interior of the cabin, and actuating means for said pilot valves including expansible chamber devices each having a movable wall, one of said movable walls being subjected on one side to cabin pressure and on its other side to a substantial vacuum and the other of said movable walls subjected on one side to external pressure and on its other side in part to a substantial vacuum and in part to cabin pressure.

17. A pressure control device for aircraft cabins comprising in combination a member having a port therethrough, a valve movable relative to said member for controlling the flow of fluid through said port, an evacuated bellows held at one end stationary and connected at its other end to a movable plate, a bellows device connected at one end to said movable plate, and operatively connected at its other end to said valve, abutment means engageable by said plate for limiting the expansion of said evacuated bellows, means for subjecting said bellows and bellows device externally to cabin air pressure, means for subjecting the interior of said bellows device to atmospheric pressure, and means for elongating said evacuated bellows effective only when cabin pressure falls a predetermined amount from sea level atmospheric pressure.

18. In a cabin pressure controlling mechanism a valve movable to control the pressure in the cabin whose pressure is to be controlled, air pressure differential operated actuating means for said valve, means for subjecting one side of such actuating means to the pressures in the cabin, means providing a chamber communicating with the other side of said actuating means, means providing a connection with a point outside said cabin, a valve for controlling communication between said connection-providing means and said chamber, means providing a continuous restricted communication between said chamber and the cabin whose pressure is to be controlled, and actuating means for said last-mentioned valve, including a double bellows device, defining an evacuated chamber, and a diaphragm forming a common end for said bellows and having unequal oppositely facing surfaces, the smaller of said surfaces being subjected to cabin air pressure and the larger of such surfaces being subjected to the pressure outside of said cabin.

19. In aircraft comprising a pressure cabin and the means delivering air thereto at greater than atmospheric pressure, a cabin pressure control system comprising a valve in the cabin wall for bleeding air therefrom, an expansible chamber device for controlling the position of said valve, control means associated with said expansible chamber device for causing operation of said valve to maintain pressure within said cabin at a constant ratio to and above the surrounding atmospheric pressure at all flight altitudes above that altitude at which such ratio is attained through the decrease in external pressure due to increase in flight altitude while cabin pressure is maintained above atmospheric pressure, and other control means associated with said expansible chamber device for causing operation of said valve, including means adjustable to equate cabin and atmospheric pressures at different selected altitudes above sea level and including means for maintaining cabin pressure and atmospheric pressures substantially equal up to such a selected altitude and for maintaining the cabin pressure constant at the selected pressure during aircraft ascent in an altitude range above such selected altitude, each of said control means including a movable pilot valve and a cooperating seat and governing flow of fluid relative to said expansible chamber device, said first mentioned control means including a bellows device comprising inner and outer bellows elements and means cooperating with said elements to enclose a chamber between them and to provide an end closure for the space surrounded by the smaller bellows, the space between said bellows being evacuated, and means for subjecting the space within the smaller bellows and the space outside of said bellows respectively to cabin and to outside-the-cabin pressures, and said second mentioned control means including an evacuated bellows subjected externally to cabin pressure.

20. In a cabin pressure controlling apparatus, a valve member movable to effect variation in cabin pressure, differential pressure-operated controlling means for said valve member, means including a valve device for subjecting one side of said differential pressure operated controlling means to different pressures, and pressure-responsive control mechanisms for said valve device, said control mechanisms including a bellows device subjected upon its opposite sides to cabin pressure and to exterior pressure, and having its opposite ends operatively connected respectively to said valve device and to a support member, and an evacuated bellows device having its opposite ends operatively connected respectively to a stationary mounting and to said support member for controlling the position of the latter.

21. In a valve mechanism, a valve seat, a valve movable relative to said seat, an expansible chamber device for actuating said valve, and a pilot device for controlling the flow of fluid relative to said expansible chamber device including a valve member and a plurality of fluid actuated operating devices for said valve member, said operating devices effective throughout different predetermined pressure ranges for controlling said valve member.

22. Mechanism to control aircraft cabin pressure comprising a valve operable to control flow of air through the cabin, pneumatic means operatively connected to move said valve and communicating with a relatively high air pressure region, duct means establishing communication between said pneumatic means and a low air pressure region at a pressure substantially lower than that of such high air pressure region, and means in said duct means automatically operative in accordance with a substantially constant, predetermined ratio of cabin air pressure to atmospheric pressure to control the air pressure impressed on said pneumatic means by said low air pressure region and thereby to effect operation of said valve to prevent the ratio of cabin air pressure to atmospheric pressure exceeding a predetermined value.

23. In aircraft cabin pressure controlling mechanism, valve means movable to control the pressure in the cabin, a diaphragm sealed about its edges and defining an expansible chamber at one side thereof, means for subjecting the opposite side of said diaphragm to the pressure in the cabin, means providing a continuous restricted communication between the cabin and said chamber, means providing a connection between said chamber and a region of reduced pressure, a pilot valve received within said chamber for controlling the flow of fluid from said chamber through said connection to the region of reduced pressure, pressure responsive control bellows means subjected to cabin air pressure and to reduced pressure, and means operatively connecting said bellows means to said pilot valve for moving the same.

24. Mechanism to control pressure within an aircraft cabin whereinto air is continually supplied under pressure, comprising an outflow valve, a valve control member operatively connected to said valve to effect movement thereof, a pressure-sensitive element, and means operatively connecting said pressure-sensitive element to said valve control member to vary the opening of said valve, and thereby to maintain cabin air pressure elevated above atmospheric pressure, said means including a further pressure-sensitive element and a connection therefor in said means opposing, by movement of said further pressure-sensitive element, the action of said first pressure-sensitive element on said valve control member to prevent the ratio of cabin air pressure to atmospheric pressure exceeding a selected value.

25. The mechanism defined in claim 24, in which the first pressure sensitive element is an evacuated bellows having its exterior subjected to cabin air pressure.

26. The mechanism defined in claim 24, and means to subject opposite sides of the first pressure sensitive element respectively to cabin air pressure and to atmospheric pressure.

27. In a valve mechanism, a valve seat, a valve movable relative to said seat, an expansible chamber device for actuating said valve, a pilot valve for controlling the flow of fluid relative to said expansible chamber device, two pressure responsive operating devices operatively connected to actuate said pilot valve and aligned with each other and with said pilot valve, and stop means operable to limit movement of one of said pressure responsive operating devices while the other remains operative to actuate said pilot valve.

JAMES B. COOPER.
ALFRED B. JEPSON.

REFERENCES CITED

The following references are of record in the file of this patent:

UNITED STATES PATENTS

| Number | Name | Date |
|---|---|---|
| 2,208,554 | Price | July 16, 1940 |
| 2,265,461 | Wagner | Dec. 9, 1941 |
| 2,276,371 | Cooper | Mar. 17, 1942 |
| 2,284,984 | Nixon et al. | June 2, 1942 |
| 2,407,257 | Del Mar | Sept. 10, 1946 |
| 2,449,231 | Jerger | Sept. 14, 1948 |
| 2,450,881 | Cooper et al. | Oct. 12, 1948 |
| 2,549,672 | Del Mar | Apr. 17, 1951 |
| 2,549,690 | Klemperer | Apr. 17, 1951 |

FOREIGN PATENTS

| Number | Country | Date |
|---|---|---|
| 514,055 | France | Nov. 8, 1920 |
| 521,623 | Great Britain | May 27, 1940 |

OTHER REFERENCES

"Pressurized Cabin Control" by Tinker and Hubbard, pub. Aviation, January 1941, pp. 38, 119, 124.